July 26, 1960  M. C. ROHR  2,946,575
CARBURETOR AIR HEATING DEVICE
Filed Oct. 27, 1958

INVENTOR.
Milton C. Rohr
BY
R. H. Barnard
ATTORNEY

United States Patent Office 2,946,575
Patented July 26, 1960

2,946,575
CARBURETOR AIR HEATING DEVICE

Milton C. Rohr, Royal Oak, Mich., assignor to General Motors Corporation, Detroit, Mich., a corporation of Delaware Filed Oct. 27, 1958, Ser. No. 769,826

3 Claims. (Cl. 261—16)

The present invention relates to a carburetor in which improved fuel vaporization is achieved by providing means for heating the fuel at the time of its entrance into the fuel induction passage. Further, the present invention provides means for eliminating carburetor icing which occurs in the booster or main fuel venturi. More specifically, the present invention relates to a device in which exhaust manifold heated air is conveyed to the intake side of the booster or fuel venturi to heat the fuel as it issues therefrom.

It is an established fact that improved engine operation is realized if the fuel supplied from the carburetor is in a vaporized form. Vaporized fuel mixes more completely with the air and further does not deposit on the intake manifold as occurs when fuel is introduced in a liquid state. In the past, various devices have been utilized to heat fuel but in most instances the means whereby the heating is achieved was too complicated and hence too costly for commercial utilization.

It is an object of the present invention to provide an inexpensive means whereby carburetor fuel is effectively heated. In the present invention it is possible to utilize an exhaust stove device, normally already present to provide heated air to an automatic choke mechanism, to provide a stream of heated air inducted into the carburetor intake passage at the entrance of the booster or fuel venturi.

The same fuel heating means delivers sufficient warm air to the fuel induction passage to preclude the formation of ice in the throat of the booster venturi as occurs under certain critical operating conditions.

The details as well as other objects and advantages of the present invention will be apparent from a perusal of the detailed description which follows.

Figure 1:
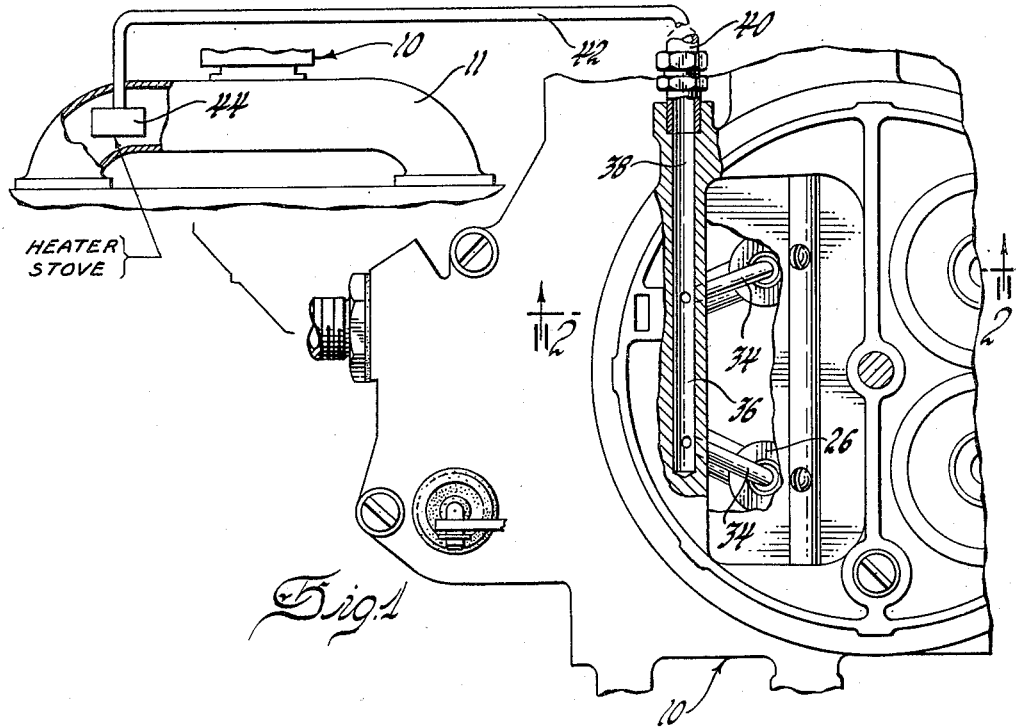
Figure 1 illustrates a carburetor embodying the subject invention.
Figure 2:
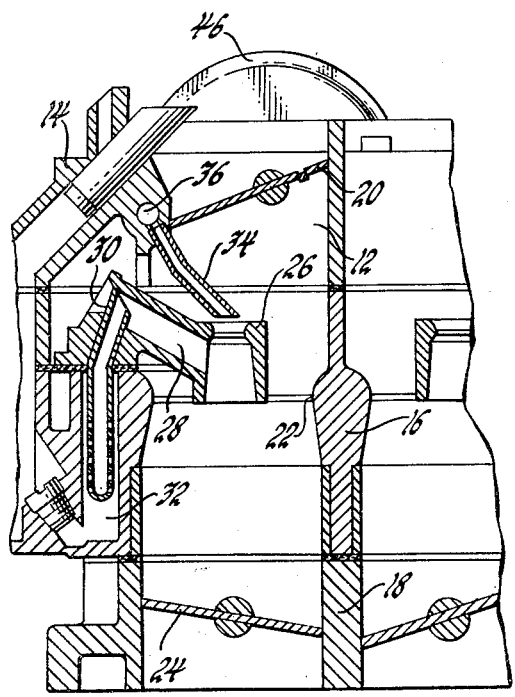
Figure 2 is a view along line 2—2 of Figure 1.

Referring to Figure 1, a carburetor is indicated generally at 10 and is mounted on manifold 11. Save insofar as it will be specifically described hereinafter, the construction of the carburetor is otherwise conventional. Carburetor 10 includes an induction passage 12 formed through cover, float bowl and throttle casings 14, 16 and 18. A choke valve 20 is disposed in cover casing 14 for controlling the fuel-air ratio under cold operating conditions. A main or primary venturi 22 is formed in the float bowl casing portion of induction passage 12. A throttle valve 24 is disposed in throttle casing 18 for controlling the quantity of combustible mixture flowing from passage 12.

A conventional booster or fuel venturi 26 is disposed in induction passage 12 and terminates at its lower end at the throat of primary venturi 22. Booster venturi 26 communicates through a passage 28 with a fuel nozzle 30 disposed in fuel well 32. In the conventional manner, air flow through venturi 26 induces a proportional fuel flow through passage 28 which is discharged into induction passage 12.

In order to heat the fuel issuing from booster venturi 26, a tube 34 is mounted in cover casing 14 and extends downwardly terminating at its lower end in generally coaxially spaced relation to the air inlet side of the booster venturi. The other end of tube 34 communicates with a passage 36 formed through casing 14. End 38 of passage 36 is connected by a fitting 40 with a conduit 42. Conduit 42 leads to a stove member 44 mounted on or disposed within a hot or exhaust portion of manifold 11.

Exhaust stove 44 is of any conventional design utilized to provide a source of heated air to a device such as an automatic choke mechanism indicated generally at 46.

With the parts as so arranged, air flow through induction passage 12 will induce air to flow through stove 44, conduit 42, passage 36 and be discharged through tube 34. Hot air from tube 34 will mix with and heat the fuel issuing from the booster venturi vaporizing the same and providing for more complete combustion of the mixture flowing to the intake manifold.

In addition to vaporizing the fuel being inducted into the intake manifold, the heated air being drawn into the induction passage through tube 34 warms booster venturi 26 preventing the formation of ice in the venturi throat as occurs during certain critical operating and atmospheric conditions. It is apparent, therefore, that the present invention contributes in several ways to more effective carburetor and engine operation in providing a more complete mixture of air and fuel and further in the prevention of venturi icing.

I claim:

1. A charge forming device for an internal combustion engine comprising an intake passage, a throttle valve disposed in said intake passage, primary venturi means in said intake passage anteriorly of the throttle valve, a booster venturi in said induction passage terminating at one end at the throat of the primary venturi, a source of fuel, passage means communicating said fuel source with said booster venturi, a source of heated air, conduit means communicating at one end with said heated air source, the other end of said conduit means terminating at the induction passage anteriorly of the booster venturi, a tube member communicating with the said other end of said conduit means, said tube member extending within the induction passage and terminating proximate the inlet side of the booster venturi whereby air flow through said induction passage will draw heated air through said tube means causing the same to mix with the fuel issuing from said booster venturi.

2. A charge forming device as set forth in claim 1 in which said tube member is coaxially aligned with said booster venturi.

3. A charge forming device as set forth in claim 1 in which the end of the tube member opens toward the booster venturi.

References Cited in the file of this patent

UNITED STATES PATENTS

| | | |
|---|---|---|
| 1,739,563 | Thomas | Dec. 17, 1929 |
| 1,865,514 | Godward | July 5, 1932 |